G. H. F. HOLY.
SPRING LOCKING DEVICE.
APPLICATION FILED DEC. 10, 1919.
1,431,954.
Patented Oct. 17, 1922.
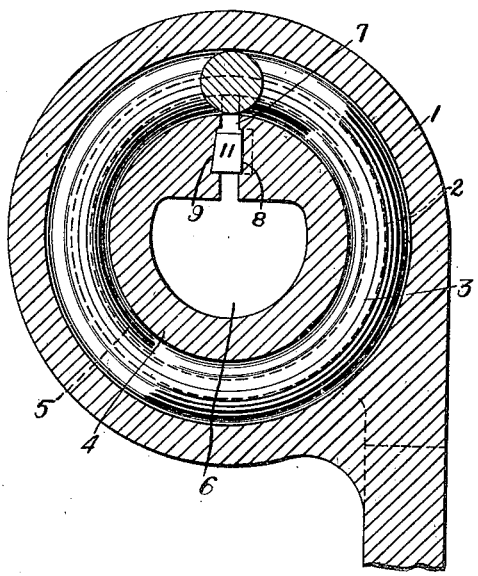
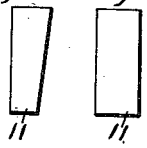
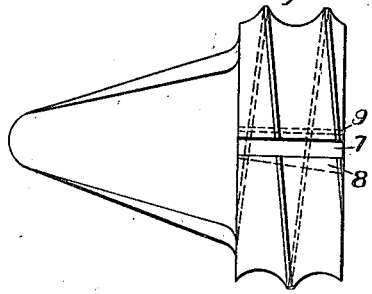
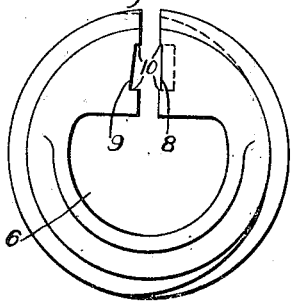
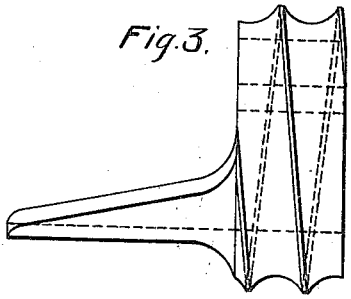
WITNESSES:
J. A. Helsel.
Fred A. Lind.
INVENTOR
George H. F. Holy,
BY
Wesley G. Carr
ATTORNEY Patented Oct. 17, 1922.

1,431,954

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

SPRING-LOCKING DEVICE.

Application filed December 10, 1919. Serial No. 343,984.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Spring-Locking Devices, of which the following is a specification.

My invention relates to flexible devices of the coupling or gear type employing helical springs, and it has particular relation to the means for attaching the end turns of the helical springs to the spring-holding arms in the apparatus of the character designated.

The object of my invention is to provide a device whereby the end turn of the spring shall be held in a substantially rigid position, and in which the possibility of damage to the end turns shall be largely avoided.

In the accompanying drawings, Figure 1 is a sectional view of one spring-holding arm of a flexible device, showing the spring held in position by means of a device embodying my invention; Figs. 2 to 4 inclusive are detailed views of an expansible member which engages the inner periphery of the spring member in a device embodying my invention; and Figs. 5 and 6 are detailed views of a wedge adapted for use therewith.

Heretofore, in the manufacture of flexible couplings of the type wherein two spider members are coupled through short helical springs, seated between the respective arms of the spider members, it has been customary to provide the openings in the spring-holding arms with internal threads of slightly greater diameter than the outer periphery of the spring member. The spring member is screwed into these threads, after which a second member, having threads upon the outer periphery thereof and of slightly lesser diameter than the inner periphery of said spring, is screwed into place inside the spring, directly within the spring-holding member. This second member is expansible, being provided with a slot into which a member of wedge shape is driven, causing the periphery thereof to engage the spring and to force it into engagement with the threads of the spring-holding member. Considerable difficulty has been experienced on account of the fact that the wedging member frequently comes into engagement with the inner periphery of the end turns of the spring, sometimes cutting a notch therein. On account of the localization of stresses frequently present in the end turns of the spring, this notch is, at times, the direct cause of spring breakage.

By my invention, the range of movement of the wedging member is restricted to a single plane, in which it cannot engage a portion of the spring member, thereby eliminating any possibility of injury to the spring therefrom.

For a better understanding of the detailed features of my invention, reference may now be had to the drawings, in which I show a spring-holding member 1, provided with threads 2 on the inner periphery thereof, and a helical spring 3 in threaded engagement therewith. A centrally disposed member 4 is provided with threads 5 on the outer periphery thereof which are in threaded engagement with the inner periphery of the spring 3. The member 4 is provided with a relatively large opening 6 therein, which renders it expansive and with a substantially radial slot 7, extending from the opening 6 to the outer periphery of the member 4. The walls of the slot 7 are provided with grooves 8 and 9 respectively, each groove being provided with side walls or shoulders 10. As best shown in Figs. 2 and 4, the bottom of the slot 8 slopes in a direction longitudinally of the spring member, while the bottom of the slot 9 is disposed at an angle to the radius of the spring member.

A wedging member 11, as best shown in Figs. 5 and 6, is adapted to be inserted in the slots 8 and 9, and is tapered on one side only, in the direction longitudinally of the spring member when in position. The advantage of the longitudinal tapering of the slot 8 and the wedge member 11 is that it provides for the proper expansion of the member 4 when the wedge is driven into position. The advantage of the inclination of the bottom of the slot 9 is that the wedge, under all conditions tends to move into the widest part of the slot and is, therefore, held firmly in position. In the event that the wedges vary slightly in width, the sloping of the bottom of the slot 9 serves to permit of its disposition in a portion of the slot of suitable width, thus preventing chafing between the spring and the spring-holding member. The slots 8 and 9 are spaced from the threads 5 in order that there shall be no possibility of the wedge 11 at any time engaging any portion of the spring 3, which, in the past, has frequently resulted in impairment thereof.

While I have shown but one form of my invention, and have described in detail but a single application of the same, it will be obvious to those skilled in the art, that it is not so limited, but that various minor modifications and changes may be made therein without departing from the spirit thereof, and I desire, therefore, that only such limitations shall be placed thereon as are imposed by the prior art or are set forth in the appended claims.

I claim as my invention:

1. In a resilient device, a helical spring member, a member for engaging one surface of said spring member, a second member for engaging an oppositely disposed surface, means for causing one of said members to forcibly engage said spring member, and means for protecting said spring member from said first mentioned means.

2. In a resilient device, a helical spring member, a member for engaging the outer periphery of the end turns of said spring, an expansible member for engaging the inner periphery of said end turns, means for expanding said expansible member, and means for protecting said end turns from said first mentioned means.

3. In combination, in a resilient device, a helical spring member, a member conforming to the outer periphery of said spring member and in engagement therewith, an expansible member conforming to the inner periphery of said spring member, a wedging device for expanding said expansible member, and means for retaining said wedging device within a predetermined range of positions.

4. In combination, in a resilient device, a helical spring member, a member conforming to the outer periphery of said spring member and in engagement therewith, an expansible member conforming to the inner periphery of said spring member but of slightly lesser diameter and having a substantially radial slot therein provided with two spaced shoulders on one wall thereof, and a wedging member adapted to be driven into said slot between said shoulders.

5. In combination in a resilient device, a helical spring member, a member conforming to the outer periphery of said spring member and in engagement therewith, an expansible member conforming to the inner periphery of said spring member but of slightly lesser diameter and having a substantially radial slot in one side thereof, two radially spaced shoulders provided on each wall of the slot, and a wedging member adapted to be inserted in the said slot between said shoulders.

6. In combination in a resilient device, a helical spring member, a member conforming to the outer periphery of said spring member and in engagement therewith, an expansible member conforming to the inner periphery of said spring member but of slightly lesser diameter and having a substantially radial slot in one side thereof, relatively smaller slots provided in each of the walls of said radial slot, and a wedging member adapted to engage the bottoms of both of the smaller slots.

7. In combination, in a resilient device, a helical spring member, a member conforming to the outer periphery of said spring member and in engagement therewith, an expansible member conforming to the inner periphery of said spring member but of slightly lesser diameter and having a substantially radial slot in one side thereof, relatively smaller slots provided in each of the walls of said radial slot, said smaller slots being in spaced relation with said spring member and being each provided with shoulders on both sides thereof, and a wedging member adapted to engage the bottom and certain of the shoulders of both of said smaller slots.

8. In combination, in a resilient device, a helical spring member, a member conforming to the outer periphery of said spring member and in engagement therewith, an expansible member conforming to the inner periphery of said spring member but of slightly lesser diameter and having a substantially radial slot in one side thereof, relatively smaller slots provided in each of the walls of said radial slot, said smaller slots being in spaced relation with said spring member and being each provided with shoulders on both sides thereof, and a wedging member adapted to engage the bottom and certain of the shoulders of both of said smaller slots, said wedging member and the bottom of one of said smaller slots being tapered in a direction longitudinally of said spring member, and the bottom of the other of said smaller slots being disposed at an angle to the radius of said spring member.

9. In combination, in a resilient device, a helical spring member, a member conforming to the outer periphery of said spring member and in engagement therewith, an expansible member conforming to the inner periphery of said spring member but of slightly lesser diameter and having a substantially radial slot in one side thereof, a relatively smaller slot provided in one of the walls of the said radial slot, and a wedging member adapted to engage the wall of said slot and the oppositely-disposed wall of the radial slot.

In testimony whereof, I have hereunto subscribed my name this 3rd day of December 1919.

GEORGE H. F. HOLY.